United States Patent

Tsukahara et al.

Patent Number: 6,060,845
Date of Patent: May 9, 2000

[54] RASTER DISTORTION CORRECTION AND DEFLECTION CIRCUIT ARRANGEMENT

[75] Inventors: Masahisa Tsukahara, Fujisawa; Toshimitsu Watanabe, Yokohama; Makoto Kitamura, Yokohama; Takeshi Mochizuki, Yokohama, all of Japan

[73] Assignees: Hitachi, Ltd., Tokyo; Hitachi Video and Information Systems, Inc., Kanagawa-ken, both of Japan

[21] Appl. No.: 08/944,965

[22] Filed: Oct. 7, 1997

[30] Foreign Application Priority Data

Oct. 7, 1996 [JP] Japan .................................. 8-265736

[51] Int. Cl.$^7$ .............................. H01J 29/56; H01J 29/70
[52] U.S. Cl. .......................... 315/370; 315/371; 315/387
[58] Field of Search .................... 315/411, 395, 315/387, 371, 370; 348/806

[56] References Cited

U.S. PATENT DOCUMENTS

| | | | |
|---|---|---|---|
| 3,668,463 | 6/1972 | Smith et al. | 315/370 |
| 3,721,858 | 3/1973 | Shimizu | 348/380 |
| 3,959,689 | 5/1976 | Ikoma | 315/370 |
| 4,184,104 | 1/1980 | Shouse, Jr. | 315/371 |
| 4,423,358 | 12/1983 | Hollander | 315/371 |
| 4,559,481 | 12/1985 | Dietz | 315/411 |
| 4,779,030 | 10/1988 | Talks et al. | 315/408 |
| 4,827,194 | 5/1989 | Fernsler | 315/371 |
| 4,901,156 | 2/1990 | Yook | 358/243 |
| 4,956,587 | 9/1990 | Kitou et al. | 315/408 |
| 5,021,719 | 6/1991 | Arai et al. | 315/364 |
| 5,357,175 | 10/1994 | Kamada et al. | 315/411 |
| 5,627,437 | 5/1997 | Kim | 315/399 |

FOREIGN PATENT DOCUMENTS

| | | | |
|---|---|---|---|
| 60-223380 | 11/1985 | Japan | H04N 3/233 |
| 63-279672 | 11/1988 | Japan . | |
| 3-24829 | 4/1991 | Japan | H04N 3/23 |
| 7-250255 | 9/1995 | Japan | H04N 3/16 |
| 8-9187 | 1/1996 | Japan | H04N 3/23 |

Primary Examiner—Edward P. Westin
Assistant Examiner—Nikita Wells
Attorney, Agent, or Firm—Antonelli, Terry, Stout & Kraus, LLP

[57] ABSTRACT

A raster distortion correction and deflection circuit arrangement includes a deflection coil adapted to be mounted on a cathode ray tube, a horizontal deflection coil driving circuit for passing a current of saw-tooth waveform of a horizontal deflection period through a horizontal deflection coil constituting the deflection coil, a flyback transformer the primary winding of which is connected between a power supply and an output terminal of the horizontal deflection coil driving circuit, an S-correction capacitor connected in series with the horizontal deflection coil, and an anode voltage detection circuit for detecting variations in an anode voltage of the cathode ray tube which is a secondary winding output of the flyback transformer. A raster distortion correction current based on an output voltage of the anode voltage detection circuit is injected into a connection point of the horizontal deflection coil and the S-correction capacitor. A signal from a signal detection circuit for ABL connected to the flyback transformer can be employed together with an output of the anode voltage detection circuit or in substitution for it for generating the raster distortion correction current.

9 Claims, 5 Drawing Sheets

ANODE VOLTAGE DETECTION SIGNAL

DISTORTION CORRECTION CURRENT

SCREEN

HORIZONTAL DE-
FLECTION CURRENT

ANODE
VOLTAGE

RASTER DISTORTION CORRECTION AND DEFLECTION CIRCUIT ARRANGEMENT

BACKGROUND OF THE INVENTION

The present invention relates to a deflection circuit arrangement for controlling the scanning of an electron beam of a cathode ray tube.

A conventional deflection circuit arrangement will be described below with reference to FIG. 6 and FIGS. 7A through 7C. FIG. 6 is a constitution diagram showing a diode modulator type horizontal deflection circuit capable of correcting the side pincushion distortion of a rectilinear raster and a high-voltage generating circuit. FIG. 7A shows a pattern composed of three horizontal bars reproduced on a screen. FIG. 7B shows a horizontal deflection current waveform at the time of reproducing the pattern of FIG. 7A. In FIG. 6, the reference numerals respectively stand for: 2: a horizontal deflection coil, 3: a horizontal deflection output transistor, 4: a first resonant capacitor, 5: a second resonant capacitor, 6: a first damper diode, 7: a second damper diode, 9: a flyback transformer, 10: a capacitor, 11,12: resistors, 14: a diode modulation coil, 15: a horizontal size control circuit.

In a wide-angle deflection cathode ray tube, deflection currents of ideal saw-tooth waveform through the deflection coil distort the reproduced picture on its screen such that the reproduced picture is stretched at the edges of the screen, and the saw-tooth waveform of the deflection current needs to be distorted slightly toward the shape of the letter S. This current waveform distortion is obtained by connecting a capacitor in series with the deflection coil. A capacitor 8 in FIG. 6, which is inserted for this purpose, is commonly called a "S-correction capacitor", this nomenclature being derived from the shape of the above-mentioned waveform.

In such a case as displaying a white raster, a beam current is automatically limited to a certain value not to flow excessively. As shown in FIG. 6, the capacitor 10 is connected in series with the flyback transformer 9 to detect a current flowing into the flyback transformer and the detected current controls the voltages for controlling display contrast and brightness in the video preamplifier IC. This circuit is called an ABL (an Average Brightness Limiter) and is shown as ABL 40 in FIG. 6. The ABL detection signal of ABL 40 in FIG. 6 is used for this purpose.

A first resonant circuit is composed of the first resonant capacitor 4, the horizontal deflection coil 2, and a primary winding of the flyback transformer 9. A second resonant circuit is composed of the second resonant capacitor 5 and the diode modulation coil 14. A horizontal drive signal 50 is applied to a base of the horizontal deflection output transistor 3, thereby flowing the deflection current of saw-tooth waveform of a horizontal deflection period through the horizontal deflection coil 2. At the same time, flyback pulses appearing at a collector of the horizontal output transistor 3 are raised by the flyback transformer 9 to provide an anode voltage.

As is shown in FIG. 7A, if the pattern comprising top and bottom black horizontal bars and a center white horizontal one is reproduced, the anode voltage drops for a portion of signals corresponding to white signals as shown in FIG. 7C. This spreads a portion of the raster associated with white signals horizontally. To correct this distortion, variations in the anode voltage is detected by a combination of resistors 11 and 12, and the obtained anode voltage detection signal is fed to the horizontal size control circuit to suppress variations in horizontal size of a white area of the raster. Such a device has been disclosed in Japanese Patent Application Laid-Open No. Sho 63-279672 and Japanese Patent Application Laid-Open No. Hei 8-9187.

For reproduction of an image pattern containing a white peak as shown in FIG. 7A, the beam current increases considerably at a part of the white peak. The energy corresponding to this increased beam current is compensated by an increase in the current through the primary winding of the flyback transformer 9 from +B power supply. In addition to this current, the S-correction capacitor 8 supplies a current through the horizontal deflection coil 2. The current through the horizontal deflection coil 2 has a combined waveform of the white-peak-related variation component and the saw-tooth wave of horizontal deflection period as shown in FIG. 7B. Otherwise straight vertical lines appear distorted in a right-left asymmetric fashion on the screen as shown in FIG. 7A.

SUMMARY OF THE INVENTION

In the present invention, accordingly, in order to solve the above-mentioned problem, a raster distortion correction current based upon an output voltage from an anode voltage variation detection means or a signal voltage detected for ABL (Average Brightness Limiter) is passed through the horizontal deflection coil. The right-left asymmetric raster distortion is suppressed by passing such a raster distortion correction current through the horizontal deflection coil as to cancel variation component flowing in the horizontal deflection coil corresponding to bright and dark portions in the reproduced image.

BRIEF DESCRIPTION OF THE DRAWINGS

In the drawings, which form an integral part of the specification and are to be read in conjunction therewith, and in which like reference numerals designate similar components throughout the figures, and in which.

DETAILED DESCRIPTION OF THE PREFERRED EMBODIMENTS

Figure 1:
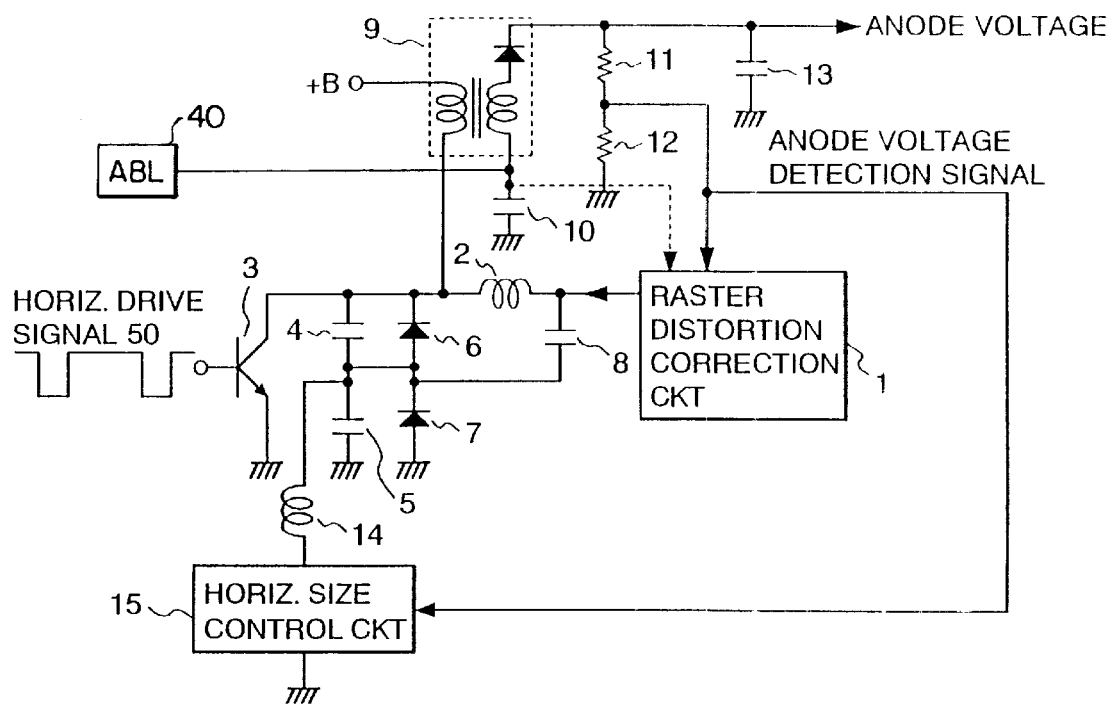
FIG. 1 is a constitution diagram showing an embodiment of the raster distortion correction and deflection circuit arrangement according to the present invention.
Figure 2:
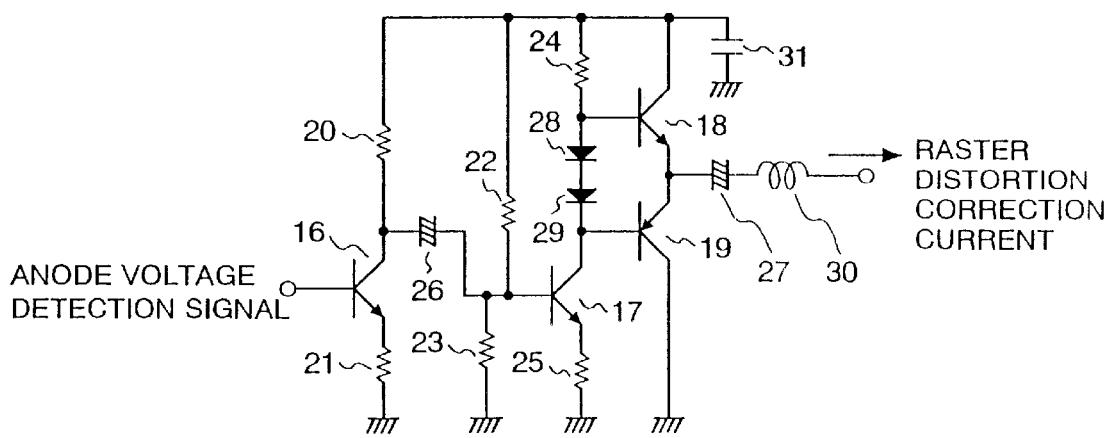
FIG. 2 is a constitution diagram showing the circuit for generating a raster distortion correction current in the embodiment of FIG. 1.
Figure 3A:
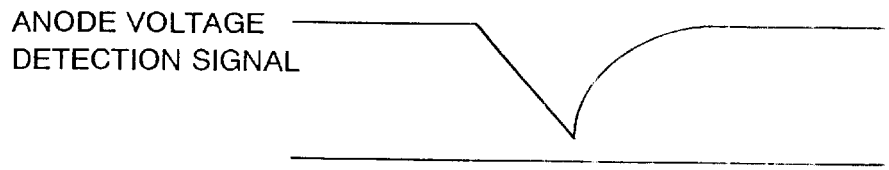
FIG. 3A and FIG. 3B respectively show a waveform of the anode voltage variation detection signal and that of the raster distortion correction current in the circuit constitution of FIG. 1.
Figure 3B:
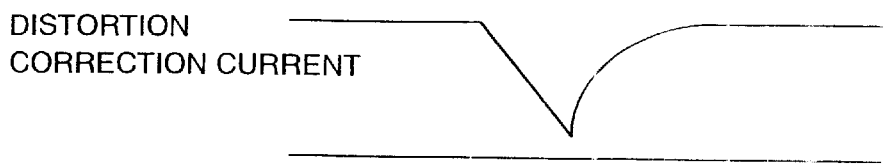

A first embodiment of the present invention will be described below with reference to FIGS. 1 through 4D. FIG. 1 shows a circuit constitution diagram of the first embodiment, and FIG. 2 shows a concrete circuit constitution diagram of a raster distortion correction circuit. FIG. 3A and FIG. 3B respectively show a waveform of an anode voltage variation detection signal and that of the raster distortion correction current in the first embodiment. FIGS. 4A to 4D show how the reproduced image and the waveform of a horizontal deflection current change depending on whether or not the raster distortion correction circuit is provided, and a waveform of an anode voltage variation. In FIG. 1, the reference numerals respectively stand for: 1: the raster distortion correction circuit, 2: a horizontal deflection coil constituting a deflection coil to be adapted to be mounted on a cathode ray tube, 3: a horizontal deflection output transistor, 4: a first resonant capacitor, 5: a second resonant capacitor, 6: a first damper diode, 7: a second damper diode, 8: an S-correction capacitor, 9: a flyback transformer, 11, 12: resistors, 13: a capacitor, 14: a diode modulation coil, 15: a horizontal size control circuit. A first resonant circuit is composed of the first resonant capacitor 4, the horizontal deflection coil 2, and a primary winding of the flyback transformer 9. A second resonant circuit is composed of the second resonant capacitor S and the diode modulation coil 14. A horizontal drive signal 50 is applied to a base of the horizontal deflection output transistor 3 to flow the deflection current of saw-tooth waveform of a horizontal deflection period through the horizontal deflection coil 2. At the same time, flyback pulses appearing at a collector of the horizontal output transistor 3 are raised by the flyback transformer 9 to provide an anode voltage.

Figure 4A:
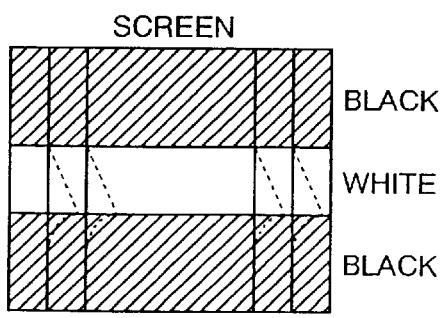
FIGS. 4A and 4C both show image distortions of a reproduced pattern comprising bright and dark portions and a reproduced image with the distortions corrected by the present invention.
Figure 4B:
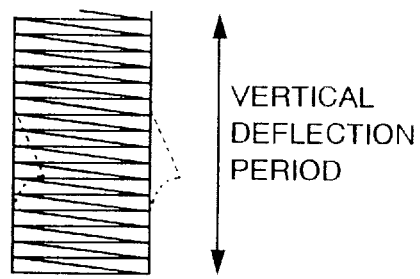
FIG. 4B shows a deflection current waveform at the time of reproducing the pattern comprising bright and dark portions.
Figure 4C:
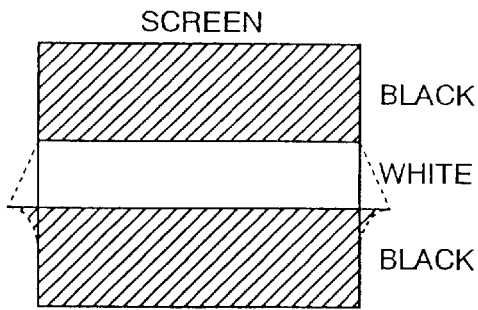
Figure 4D:
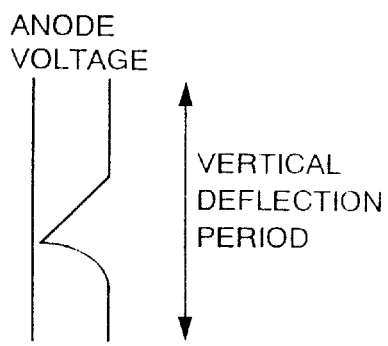
FIG. 4D shows a variation in an anode voltage at that time.

If a pattern comprising top and bottom black horizontal bars and a center white horizontal one is reproduced as shown in FIG. 4A, the anode voltage drops as shown in FIG. 4D. This results in two distortions: the right-left symmetric horizontal raster size distortion as shown by the dotted lines in FIG. 4C, and the right-left asymmetric horizontal raster size distortion which is shown by the dotted lines in FIG. 4A which is caused by a current having a waveform shown by the dotted lines in FIG. 4B that flows from the S-correction capacitor through the horizontal deflection coil to the flyback transformer.

In this embodiment, in order to correct these distortions, variations in the anode voltage are detected by using the resistors 11, 12, and the detection signal detected is fed to the horizontal size control circuit 15 to suppress the horizontal size distortions. The detection signal is also supplied to the raster distortion correction circuit 1 and amplified.

Figure 8:
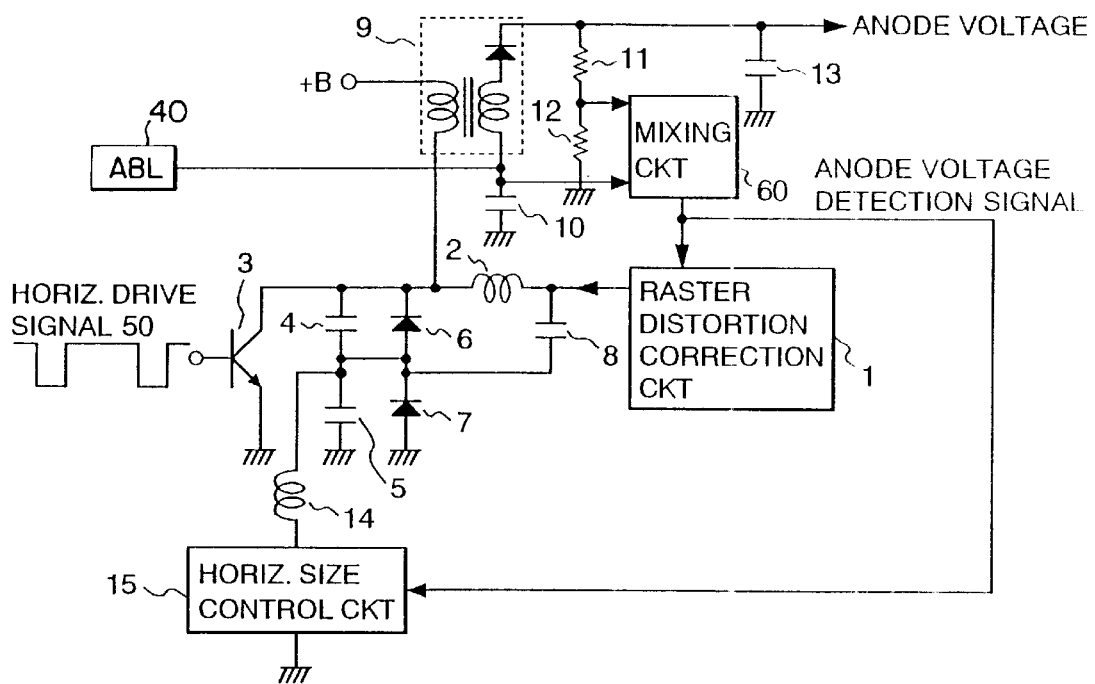
FIG. 8 shows a modification of the circuit constitution of FIG. 1.

The output of the raster distortion correction circuit 1 is connected to the connection point of the horizontal deflection coil 2 and the S-correction capacitor 8 so that the raster distortion correction current flows into the horizontal deflection coil 2 and corrects the right-left asymmetric horizontal raster size distortion. The image pattern prone to the right-left asymmetric horizontal raster size distortion is one containing a relatively wide white bar extending horizontally as shown in FIG. 4A. This means that the frequency of the required raster distortion correction current is relatively low. Accordingly, the raster distortion correction current flows into the horizontal deflection coil 2 only, but not into the S-correction capacitor 8, so that it corrects the right-left asymmetric horizontal raster size distortion as shown by the solid lines in FIG. 4A. In place of the anode voltage detection signal, the ABL detection signal originally intended for an average brightness limiter 40 can be used as shown by the dotted line in FIG. 1. Furthermore, effective is a method in which the anode detection signal and the ABL detection signal are mixed in the mixing circuit 60 to provide a mixed signal, and a raster distortion correction current based upon the mixed signal is flowed into the horizontal deflection coil as shown in FIG. 8. The components in FIG. 8, except for the mixing circuit 60, are the same as those in FIG. 1, and they are given the same reference numerals as in FIG. 1 and will not be explained further.

FIG. 2 shows a concrete circuit constitution diagram of the raster distortion correction circuit 1. The reference numerals respectively stand for: 16 through 19: transistors, 20 through 25: resistors, 26, 27: coupling capacitors, 30: a coil, 28, 29: diodes, 31: a power supply.

The anode voltage detection signal (FIG. 3A) is supplied to the base of the transistor 16 and is amplified. If the inductance value L30 of the coil 30 is sufficiently larger than the inductance value L2 of the horizontal deflection coil 2 (for example, L30=33 mH, L2=0.6 mH), the raster distortion correction current alone flows into the coil 30, while almost no component of saw-tooth of a horizontal deflection period flows into the coil 30. The frequency components of the raster distortion correction current are sufficiently lower compared with the horizontal scanning frequency, and the magnitude of the raster distortion correction current depends only on the resistance component of the coil 30 and the emitter voltages of the transistors 18, 19. This makes it possible to flow the raster distortion correction current nearly proportional to the anode voltage variations (FIG. 3B) into the horizontal deflection coil 2. Small-sized transistors of low voltage and current ratings can be used as the transistors 18 and 19, and these reduce the size of the circuit.

The present embodiment can provide a high-performance deflection circuit arrangement as well as fabricate an inexpensive and small-sized raster distortion correction circuit arrangement.

Figure 5:
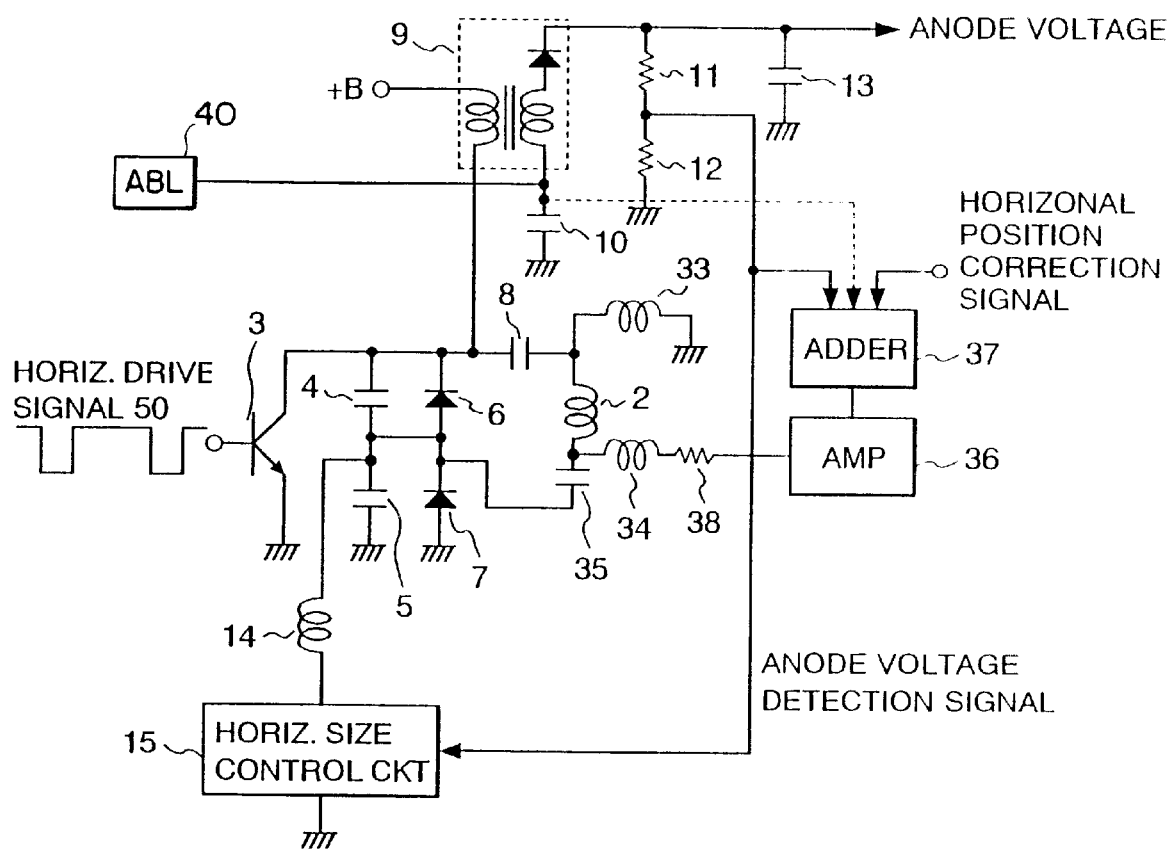
FIG. 5 is a constitution diagram showing another embodiment of the raster distortion correction and deflection circuit arrangement according to the present invention.
Figure 6:
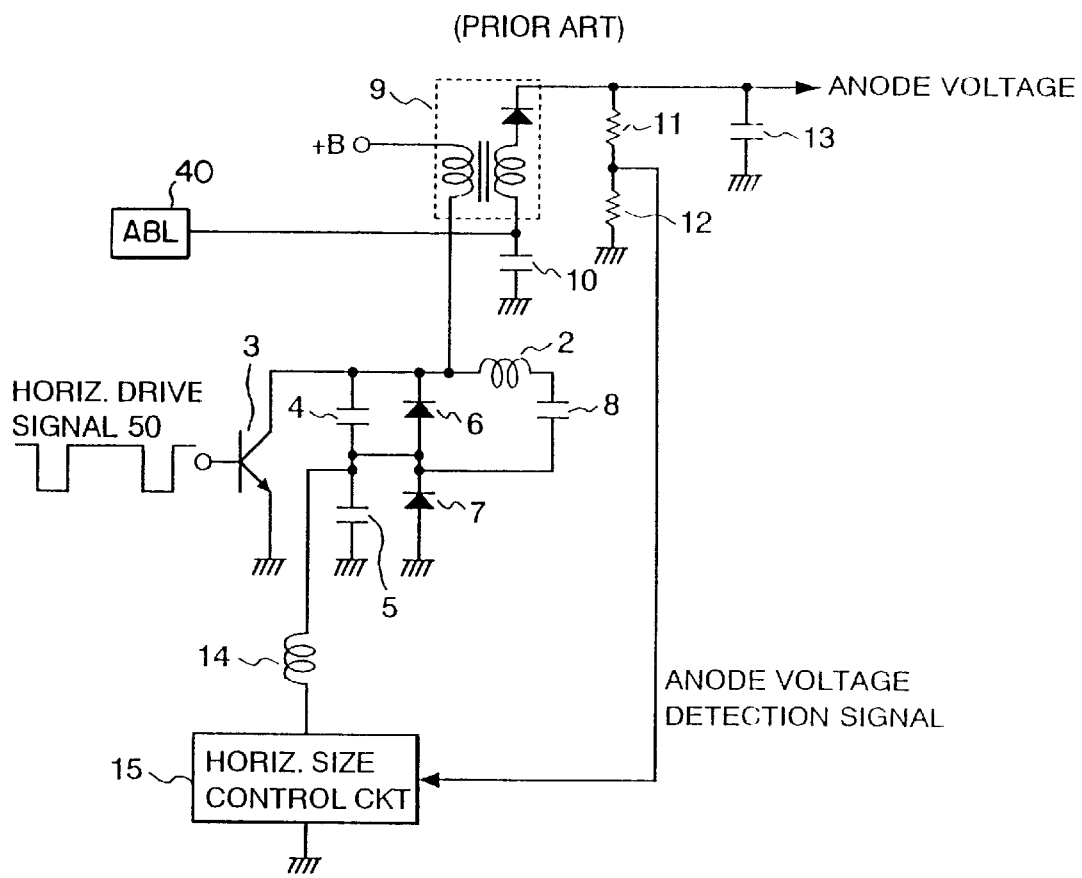
FIG. 6 is a constitution diagram showing an example of a conventional deflection circuit arrangement.
Figure 7A:
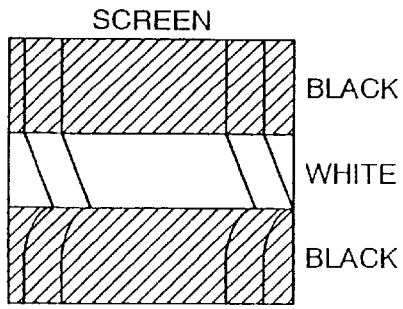
FIG. 7A shows an image distortion caused by the conventional deflection circuit arrangement at the time of reproducing the pattern comprising bright and dark portions, and FIG. 7B and FIG. 7C respectively show a waveform of the horizontal deflection current and that of the anode voltage at that time.
Figure 7B:
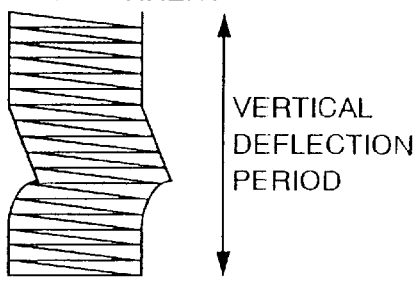
Figure 7C:

A second embodiment of the present invention will be described below, using FIG. 5. In FIG. 5, the reference numerals respectively stand for: 33: a choke coil, 34: a choke coil, 35: an adding capacitor, 36: an amplifier, 37: an adder, 38: a resistor. The same constitution components as those in the first embodiment are given the same number as in the first embodiment, and will not be described further.

The adder 37 adds the anode voltage detection signal obtained by dividing the anode voltage with the resistors 11 and 12, to a horizontal position correction signal for correcting a horizontal raster position. The adder output is amplified with the amplifier 36. The output of the amplifier 36 is connected to a series circuit consisting of the resistor 38 and the coil 34. The raster distortion correction current and the horizontal position correction current are added to the horizontal deflection current by the adding capacitor 35. The raster distortion correction current and the horizontal position correction current flow to a ground terminal through the choke coil 33 connected between an end of the horizontal deflection coil 2 and the ground terminal.

The amount of raster distortion correction is adjusted by varying the voltage division ratio determined by the resistors 11 and 12, and the amount of the horizontal raster position correction is adjusted by varying the direct-voltage value of the horizontal position correction signal independently of the adjustment of raster distortion correction.

The ABL detection signal can be used instead of the anode voltage detection signal as shown by the dotted line in FIG. 5. Furthermore, the same effects can be obtained by introducing both the anode voltage detection signal and the ABL detection signal into the adder 37.

The present embodiment can make the horizontal raster position correction and the raster distortion correction at the same time with the use of a single amplifier, and can provide an inexpensive and high-performance deflection circuit arrangement.

The present invention can correct right-left asymmetric raster distortions appearing in a reproduced image having variations in brightness. Furthermore, the present invention can make both the horizontal raster position correction and the raster distortion correction at the same time, by adding a simple circuit to a deflection circuit arrangement including a horizontal raster position correction circuit, and can provide an inexpensive and high-performance deflection circuit arrangement.

What is claimed is:

1. A raster distortion correction and deflection circuit arrangement comprising:

a deflection coil adapted to be mounted on a cathode ray tube;

a horizontal deflection coil driving circuit for passing a current of saw-tooth waveform of a horizontal deflection period through a horizontal deflection coil constituting said deflection coil;

a flyback transformer having a primary winding thereof connected between a power supply and an output terminal of said horizontal deflection coil driving circuit;

an S-correction capacitor connected in series with said horizontal deflection coil; and an anode voltage detection circuit for detecting variations in an anode voltage of said cathode ray tube, said anode voltage being a secondary winding output of said flyback transformer, wherein a raster distortion correction current based on an output voltage of said anode voltage detection circuit is injected into a connection point of said horizontal deflection coil and said S-correction capacitor.

2. A raster distortion correction and deflection circuit arrangement according to claim 1, further comprising a signal detection circuit comprising an impedance for an average brightness limiter connected to said flyback transformer, wherein a raster distortion correction current based on both a signal from said signal detection circuit for said average brightness limiter and said output voltage of said anode voltage detection circuit is injected into said connection point of said horizontal deflection coil and said S-correction capacitor.

3. A raster distortion correction and deflection circuit arrangement according to claim 1, further comprising a horizontal deflection size control circuit, wherein a horizontal deflection size is controlled based on said output voltage of said anode voltage detection circuit.

4. A raster distortion correction and deflection circuit arrangement according to claim 2, further comprising a horizontal deflection size control circuit, wherein a horizontal deflection size is controlled based on said output voltage of said anode voltage detection circuit.

5. A raster distortion correction and deflection circuit arrangement comprising:

a deflection coil adapted to be mounted on a cathode ay tube;

a horizontal deflection coil driving circuit for passing a current of saw-tooth waveform of a horizontal deflection period through a horizontal deflection coil constituting said deflection coil;

a flyback transformer having a primary winding thereof connected between a power supply and an output terminal of said horizontal deflection coil driving circuit;

an S-correction capacitor connected in series with said horizontal deflection coil; and a signal detection circuit comprising an impedance for an average brightness limiter connected to said flyback transformer, wherein a raster distortion correction current based on a signal from said signal detection circuit for said average brightness limiter is injected into a connection point of said horizontal deflection coil and said S-correction capacitor.

6. A raster distortion correction and deflection circuit arrangement according to claim 5, further comprising a horizontal deflection size control circuit, wherein a horizontal deflection size is controlled based on variations in an anode voltage of said cathode ray tube.

7. A raster distortion correction and deflection circuit arrangement comprising:

a deflection coil adapted to be mounted on a cathode ray tube;

a horizontal deflection coil driving circuit for passing a current of saw-tooth waveform of a horizontal deflection period through a horizontal deflection coil constituting said deflection coil;

a flyback transformer having a primary winding thereof connected between a power supply and an output terminal of said horizontal deflection coil driving circuit;

an S-correction capacitor connected in series with said horizontal deflection coil;

an anode voltage detection circuit for detecting variations in an anode voltage of said cathode ray tube, said anode voltage being a secondary winding output of said flyback transformer;

an adder for adding a direct current signal for horizontal raster position correction to an output voltage from said anode voltage detection circuit;

a correction current generating circuit for generating a raster distortion correction current based on an output signal from said adder;

an adding capacitor for adding an output current of said correction current generating circuit to said current of saw-tooth waveform of a horizontal deflection period; and a choke coil for flowing said output current through said horizontal deflection coil into a grounding terminal, wherein said S-correction capacitor, said horizontal deflection coil, and said adding capacitor are connected in this order to constitute a series circuit, said S-correction capacitor is connected to an output terminal of said horizontal deflection coil driving circuit, said choke coil is connected between said grounding terminal and a connection point of said S-correction capacitor and said horizontal deflection coil, an output of said correction current generating circuit is supplied to a connection point of said horizontal deflection coil and said adding capacitor.

8. A raster distortion correction and deflection circuit arrangement according to claim 7, further comprising a signal detection circuit comprising an impedance for an average brightness limiter connected to said flyback transformer, wherein a signal from said signal detection circuit for an average brightness limiter also is introduced into said adder.

9. A raster distortion correction and deflection circuit arrangement comprising:

a deflection coil adapted to be mounted on a cathode ray tube;

a horizontal deflection coil driving circuit for passing a current of saw-tooth waveform of a horizontal deflection period through a horizontal deflection coil constituting said deflection coil;

a flyback transformer having a primary winding thereof connected between a power supply and an output terminal of said horizontal deflection coil driving circuit;

an S-correction capacitor connected in series with said horizontal deflection coil;

a signal detection circuit comprising an impedance for an average brightness limiter connected to said flyback transformer;

an adder for adding a direct current signal for horizontal raster position correction to an output signal from said signal detection circuit for an average brightness limiter;

a correction current generating circuit for generating a correction current based on an output signal from said adder;

an adding capacitor for adding an output current of said correction current generating circuit to said current of saw-tooth waveform of a horizontal deflection period; and a choke coil for flowing said output current through said horizontal deflection coil into a grounding terminal, wherein said S-correction capacitor is connected to an output terminal of said horizontal deflection coil driving circuit, said choke coil is connected between said grounding terminal and a connection point of said S-correction capacitor and said horizontal deflection coil, an output of said correction current generating circuit is supplied to a connection point of said horizontal deflection coil and said adding capacitor.

* * * * *